July 18, 1933.  N. L. PERSINGER  1,918,423
AUTOMOBILE COVER APPARATUS
Filed Oct. 30, 1929
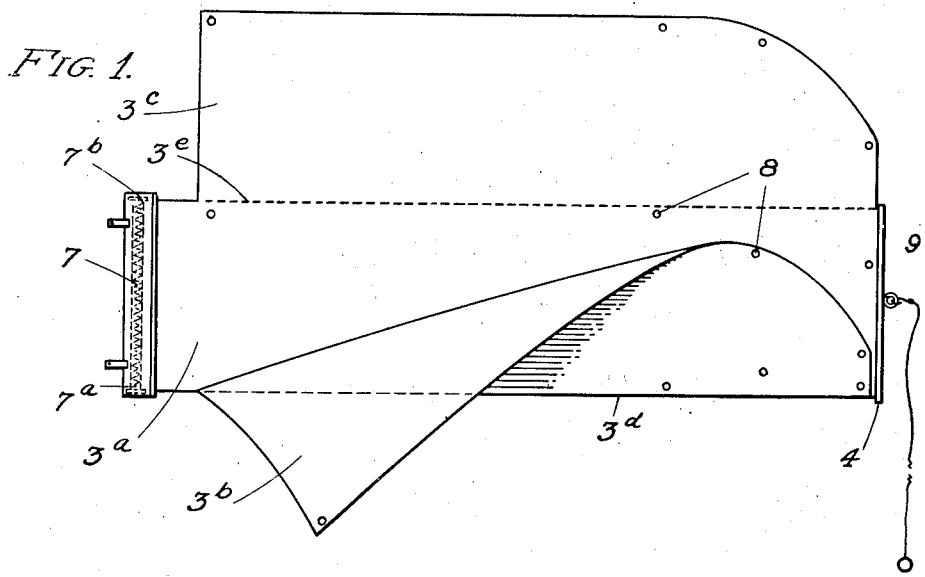
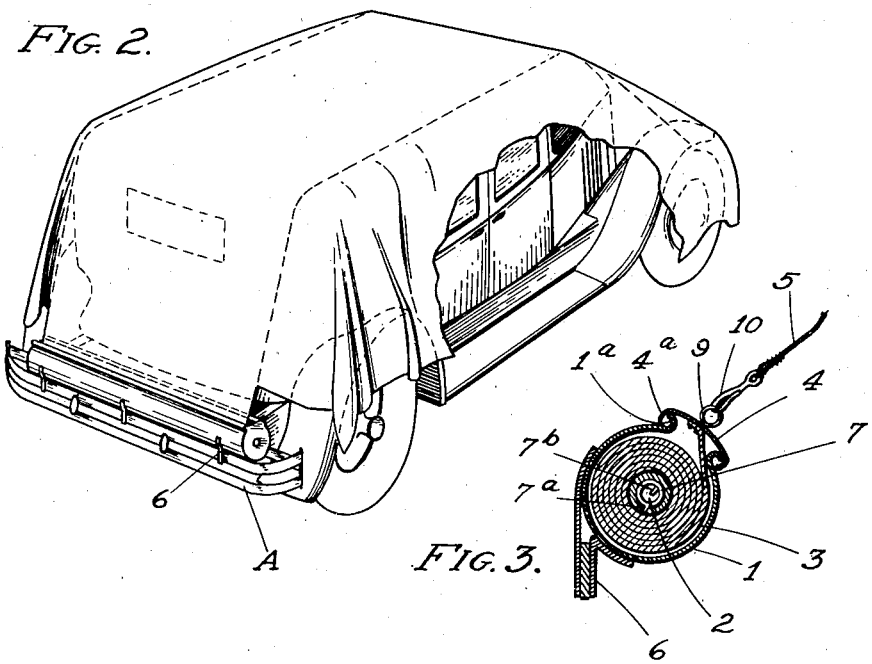
INVENTOR
NARVY L. PERSINGER.
BY
A. B. Bowman
ATTORNEY Patented July 18, 1933

1,918,423

UNITED STATES PATENT OFFICE

NARVY L. PERSINGER, OF GLENDALE, CALIFORNIA

AUTOMOBILE COVER APPARATUS

Application filed October 30, 1929. Serial No. 403,532.

My invention relates to automobile cover apparatus, and the objects of my invention are: first, to provide an apparatus of this class whereby an automobile may be temporarily covered and protected against dust, dirt, rain, and other corrosive or deteriorating agents of the elements; second, to provide an apparatus of this class whereby the automobile, or the greater portion thereof, may be easily and quickly covered by one person and with little effort; third, to provide an apparatus of this class which may be carried as a permanent fixture or accessory on the automobile so that the means for covering the automobile is instantly at hand so that the automobile may be covered even though the same is parked for a very short time; fourth, to provide an apparatus of this class which, when not in use, is mounted and enclosed in compact form at one end of the automobile and which is protected against deterioration from dust and weather, and which is prevented from becoming soiled when not in use; fifth, to provide an apparatus of this class which when unfolded covers the top and sides of the automobile, and, when folded, may be folded or rolled into compact form; sixth, to provide novel means to facilitate the drawing of the cover portion over the top of the automobile body; seventh, to provide as a whole a novel automobile cover apparatus and one which is simple and economical of construction, durable, and which will not readily deteriorate or get out of order; and, eighth, to provide a novel method of covering automobiles and the like.

With these and other objects in view as will appear hereinafter, my invention consists of certain novel features of construction, combination and arrangement of parts and portions, as will be hereinafter described in detail and particularly set forth in the appended claims, reference being had to the accompanying drawing and to the characters of reference thereon which form a part of this application in which:

Figure 1 is an illustration of my cover apparatus separate and apart from an automobile or other device, mechanism, or thing to be covered, showing the apparatus partly unfolded; Fig. 2 is a perspective view of an automobile showing my cover apparatus applied thereto and unfolded for covering the automobile, a portion of the cover apparatus being broken away to facilitate the illustration; and Fig. 3 is an enlarged transverse sectional view through the casing for enclosing the cover apparatus when not in use.

Like characters of reference refer to similar parts and portions throughout the views of the drawing.

My cover apparatus, as illustrated in the drawing, consists essentially of a tubular casing 1, a roller 2, a cover member 3, a casing cover 4, and a cord 5.

The casing 1 is preferably of cylindrical construction of sufficient diameter conveniently to house the automobile cover member 3 and is of a length, substantially the width of the body of the automobile, as shown in Fig. 2. The casing 1 may be mounted on the rear bumper A of the automobile, as shown, or on the front bumper, or other suitable place, there being provided on the casing 1 suitable clips or brackets 6 for securing the casing to the bumper. The roller 2 is rotatably mounted within the casing 1 and may be hollow for the reception of a coil spring 7 which is secured at one end to the roller or drum and at its other end to the casing 1 or other stationary member, as shown by 7a and 7b, respectively. The cover member 3 is adapted to be rolled up on the roller or drum 2 when not in use, as shown in Fig. 3.

The cover member, in this instance, consists of three main portions, namely, a central portion 3a and flaps 3b and 3c. The central portion 3a is slightly longer than the flaps and is secured at one end to the roller 2 and at its opposite end to the casing cover 4. The flaps 3b and 3c are preferably slightly narrower than the central portion 3a and are secured at their long edges to the side edges of the central portion 3a and are adapted to be folded over and onto the central portion about the edges 3d and 3e, the flap 3b folding directly against the central portion and the flap 3c folding over the flap 3b. The flaps are secured in their folded position with respect to the central portion and to each other by means of snaps 8 on all of said portions, as shown best in Fig. 1. It will be noted that the forward portions of the flaps may be cut off or slightly rounded so that when the cover member is unfolded over the automobile, the forward portions thereof will not drag on the ground.

It will be noted that although in the simplified form the flaps are narrower than the central portion 3a, the same may be wider, but an additional fold will be necessary in the flaps.

When the cover member is folded and drawn into the casing 1, the member 4 covers the opening at the side of the casing 1 through which the cover member is withdrawn. The edges of the member 4 are turned inwardly as shown by 4a. These inwardly turned portions fit over outwardly turned portions 1a adjacent the opposite sides of the long opening in the casing so that when the member 4 is placed over the opening, the opening is substantially closed against dust, dirt, rain, and weathering in general. The member 4 also reinforces the forward or extended edge of the central portion 3a of the cover member so as to facilitate the removal thereof from the casing and also the uniform drawing of the cover thereinto when acted upon by the spring. To the member 4 is secured a ring or a multiplicity of rings 9 to which may be fastened temporarily the cord 5 by means of a hook or snap 10. The cord 5 may be removed from the apparatus if desired and carried within the automobile.

In order to cover the automobile, the cord 5 is preferably secured to the ring 9. The operator may then stand at the front portion of the automobile and whip the cord over the top, or he may draw the cord over the top from the side thereof. The cover member is then withdrawn from the casing 1 by applying tension on the cord 5, the edges of the member 4 being sufficiently rounded to prevent material resistance to the drawing of said member around or over the top. The member 4 is then secured to the front bumper or other portion of the front end of the automobile, or the same may be secured thereto by the cord 5, if desired. The flaps are then unsnapped and draped over the sides of the automobile. The steps are simply reversed when again uncovering the automobile and placing the cover member within the casing.

Though I have shown and described a particular construction, combination and arrangement of parts and portions of my automobile cover apparatus, and a certain method of covering automobiles, I do not wish to be limited to this particular construction, combination and arrangement, nor to the method, but desire to include in the scope of my invention the construction, combination and arrangement of parts and portions and the method, substantially as set forth in the appended claims.

Having thus described my invention, what I claim as new and desire to secure by Letters Patent is:

1. In an apparatus of the class described, a cylindrical casing having a long narrow opening at its upper portion, a roller rotatably mounted therein, an extensible cover member mounted on the roller, and a long free cover adapted to extend tightly over the opposite edges of the opening for enclosing the open side of the casing when the cover member is enclosed therein, said long cover being secured to the extensible end of the cover member.

2. In an apparatus of the class described, a cylindrical casing having an opening at its upper portion, a roller rotatably mounted therein, a cover member mounted on the roller, and a long cover for enclosing the open side of the casing when the cover member is enclosed therein, said long cover being secured to the extended end of the cover member, the edge of the casing adjacent the opening being turned outwardly and the edges of the long cover being turnd inwardly forming a substantial weather shield for the casing when the cover member is enclosed therein.

NARVY L. PERSINGER.